(12) United States Patent
Shimizuno et al.

(10) Patent No.: US 7,689,770 B2
(45) Date of Patent: Mar. 30, 2010

(54) METHOD AND SYSTEM FOR SELECTIVELY PERMITTING CACHE MEMORY ACCESS DURING A CACHE MISS REQUEST

(75) Inventors: Koken Shimizuno, Kawasaki (JP); Hiroyuki Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 254 days.

(21) Appl. No.: 10/986,868

(22) Filed: Nov. 15, 2004

(65) Prior Publication Data
US 2006/0026361 A1    Feb. 2, 2006

(30) Foreign Application Priority Data
Jul. 27, 2004  (JP) .............................. 2004-218801

(51) Int. Cl.
*G06F 12/00* (2006.01)
(52) U.S. Cl. ...................................... 711/118; 711/137
(58) Field of Classification Search ........................ None
See application file for complete search history.

(56) References Cited

U.S. PATENT DOCUMENTS

| | | | |
|---|---|---|---|
| 5,642,494 A | 6/1997 | Wang et al. | |
| 5,742,831 A | 4/1998 | Creta | |
| 6,339,813 B1 | 1/2002 | Smith, III et al. | |

2002/0103971 A1    8/2002   Saito et al.

FOREIGN PATENT DOCUMENTS

JP         2002-229852      8/2002

OTHER PUBLICATIONS

European Search Report dated Jul. 31, 2006 in the corresponding European Application.

*Primary Examiner*—Matt Kim
*Assistant Examiner*—Kaushikkumar Patel
(74) *Attorney, Agent, or Firm*—Staas & Halsey LLP

(57) ABSTRACT

A cache memory control circuit allowing an MIB to have information concerning an upper address section of a replace address corresponding to a move-in request and information indicating whether a replace destination is valid or not includes: a first determination section (step S41) that determines whether an index and upper address section of the request address related to the move-in request and those of the request address that is related to a preceding move-in request and has been registered in the MIB do not correspond respectively to each other, a third determination section (step S42) that determines whether an index and upper address section in the address related to the move-in request and those in the replace address that is related to the preceding move-in request and has been registered in the MIB do not correspond respectively to each other; and a tag search section (step S43) that continues the processing for the move-in request in the case where an affirmative result has been obtained both in the first and third determination sections and the replace destination is valid.

8 Claims, 8 Drawing Sheets

METHOD AND SYSTEM FOR SELECTIVELY PERMITTING CACHE MEMORY ACCESS DURING A CACHE MISS REQUEST

BACKGROUND OF THE INVENTION

1. Field of the Invention

The present invention relates to a cache memory control circuit and a cache memory control method that control a CPU cache memory.

2. Description of the Related Art

FIG. 8 is a block circuit diagram schematically showing an entire configuration of a CPU. In FIG. 8, each of CPUs 1 and 2 incorporates a two-tier cache including an L1 cache (first cache) and an L2 cache (second cache) and is connected to an SC (system controller) 3, and the SC 3 is connected to a memory 4. In the above configuration, a cache memory control operation is performed as follows.

A move-in request issued from the L1 cache is passed through a pipeline of the L2 cache and a tag search is then performed with respect to the request data in a tag search section (tag section). When the result of the tag search is an L2 cache miss (S1), an MIB (move-in buffer) is acquired and a move-in request is issued to the SC 3 (S2). After receiving reply data from the main memory or other CPU, the SC 3 registers the data in the L2 cache, releases the MIB (S3) and transfers the data to the L1 cache (S4).

FIG. 9 is a block diagram showing a cache controller that performs the above operation. An MI-PORT 11 shown in FIG. 9 stores a new request issued from the L1 cache. An MO-PORT 12 stores a reply issued from the L1 cache to the L2 cache and move-out data sent from the L1 cache. An SC-PORT 13 is an internal resource that stores an order issued from the SC 3.

A priority section 14 feeds a command to a pipeline 15 in consideration of the superiority of each resource. In the pipeline 15, a tag search is performed with an address of the fed command by a tag search section (tag section) 16. In the case of an L2 cache hit, the data that is requested by the L1 cache is returned. In the case of an L2 cache miss, an MIB 17 is acquired and a move-in request is issued to the SC 3. At this time, information comparison is made between a current move-in request and a preceding move-in request that has been registered in MIB 3 at the same time as the issuance of the current move-in request in order to determine whether it is possible to continue processing for the current move-in request.

When an index of a succeeding move-in request and an index of a preceding move-in request correspond to each other, the succeeding move-in request is, in general, forced to wait until the MIB 17 has been released after completion of the processing for the preceding move-in request for protection of a replace block and guarantee of cache coherency. FIG. 10 shows a processing flow at this time. As shown in FIG. 10, it is determined whether an index of the succeeding move-in request and an index of the preceding move-in request that has been registered in the MIB do not correspond to each other (step S11). When the determination result is not affirmative (No in step 11), processing for the succeeding move-in request is forced to be in a standby state.

When the determination result is affirmative (YES in step S11), processing is continued and a tag search is performed (step S12). Then, depending on the result of the tag search (HIT or MISS in step S12), respective processing operations are performed.

Even when the result of the tag search for the succeeding move-in request is a cache hit, that is, even when the succeeding move-in request can actually be processed (the case where processing for the succeeding move-in request does not generate any problem), processing is forced to wait until the MIB 17 has been released. When an index of the succeeding move-in request and an index of the preceding move-in request do not correspond to each other, processing is performed based on the result of the tag search.

FIG. 11 shows a tag search method used in the tag search section (tag section) 16. In a tag search, firstly, matching is performed in an index 110 of a request address 100 to determine the corresponding block. Matching is then performed in an upper address section 120 to identify the corresponding 64-byte. FIG. 12 shows a data structure of the MIB 17. The MIB 17 includes a request address 100, a registration way and replace way 200, and other flags 300.

When the tag search section 16 has performed a tag search for the move-in request from the MI-PORT 11 and obtained the search result indicating a cache miss, the MIB 17 is acquired and the data related to the move-in request is stored in the acquired MIB 17 and a move-in request is then issued to the SC 3. A method of evacuating all replace targets to a replace buffer (MODQ) is available at this time in order to correctly reply to snoop processing due to the mismatch. However, this method uselessly obtains the MODQ resources in the case where a replace target is "clean victim" (block that has not been updated or changed and need not to be written back). Thus, a method of replying to snoop processing due to the mismatch without evacuating the replace target to a replace buffer (MODQ) and disabling a cache when the replace target is "clean victim".

When the matching between an index of the preceding move-in request that has been stored in the MIB 17 and an index of the succeeding move-in request is performed, there may exist many succeeding move-in requests that will be forced to wait even if the search results therefor are cache hits. In order to cope with the problem, a control circuit or method that can continue processing for the succeeding move-in requests that can actually be processed is demanded.

In the above case, when the MIB 17 is acquired due to a cache miss of the preceding move-in request and an additional succeeding move-in request is issued from the MI-PORT 11, a cache hit erroneously occurs in the case where the replace target of the preceding move-in request is "clean victim". To solve this problem, the following method has been used in the conventional art.

Firstly, states of the cache to be replaced are closely examined. When the block to be replaced is "dirty victim" (block that has been updated or changed and must be written back) at the time of occurrence of a cache miss, its tag is invalidated and data writing to the MODQ is performed. The replace data is read out from the MODQ in response to a request from the system and then written back to the memory.

Since "dirty victim" must correctly reply to the snoop processing due to mismatch even when its tag has been invalidated, "dirty victim" also holds WBA (replace address) at the MIB 17 acquisition time. As a result, when WBA of the MIB 17 and a snoop request correspond to each other even if the search result is not a cache hit, data replay is sent from the MODQ in which the replace data exists.

On the other hand, "clean victim" (block that need not to be written back and that is not invalid) is overwritten when a new cache has been registered since it need not to be written back to the memory. In this case, at the time point when a new registration has been made in a cache tag copy after the system side had received a move-in request (that is, at the time point when "clean victim" has been cleared), it is determined that there has not existed "clean victim" in the following processing. However, since it is impossible for the cache side to know the timing, "clean victim" in the cache cannot be used at the time point when a cache miss has occurred.

When a store request hits a cache in a shared state, a block type change (block type change permission) is issued to the system for the right to exclude. At this time, since a block should not be shared in a store operation, a succeeding request is forced to wait until the store operation has been executed for guarantee of cache coherency even if the succeeding request hits a shared cache of the same block as that a preceding store request has been made for.

In the system having the above configuration, when continued processing does not generate any problem even in the case where an index of a succeeding move-in request and an index stored in the MIB 17 match with each other, it is determined whether a move-in operation can be performed depending on the cache state at the time of a cache hit so that processing can be continued. The flow at this time is shown in FIG. 13. Since "dirty victim" is supposed to have been invalidated at the cache miss detection time, when a dirty block has been hit (step S21), it can be determined that a way that is entirely different from a way of a preceding request in the MIB is targeted, with the result that processing can be performed. Therefore, only in the above case (YES in step S21), it is possible to continue processing for the succeeding move-in request whose index has corresponded to the index stored in the MIB. In the case where a clean block has been hit, it is impossible to determine whether a move-in operation can be performed for the above reason, so that processing cannot be continued.

As a reference of the related art, Japanese Patent Laid-Open No. 2002-229852 is known.

In the case of a cache hit to a clean block, when the clean block is the clean victim of a preceding move-in request or that has been obtained due to an application of block type change, it is impossible to continue processing. On the other hand, any problem does not occur when processing is performed for clean blocks other than the above case. However, in the conventional art, determination is made based on a tag in some cases, so that it is impossible to determine the above case. As a result, succeeding processing operations are collectively forced to wait until the MIB has been released.

Further, the determination is made based on the result of a tag search as described above, which requires time to read out the result and involves activation of additional processing or ensuring of resources temporarily. As a result, the processing for other requests may be interrupted.

SUMMARY OF THE INVENTION

The present invention has been made to solve the above problems and an object thereof is to provide a cache memory control circuit and a cache memory control method that are allowed to determine the case where any problem does not occur if processing is continued when a succeeding move-in request hits a clean block in the case where index of the succeeding move-in request and that stored in the MIB match with each other to alleviate the condition that forces succeeding processing operations which can actually be processed to be in a standby state collectively, resulting in an increase in processing efficiency, as well as to shorten the time to determinate presence/absence of a cache hit in processing for the succeeding requests, resulting in prompt determination of also the case where the succeeding processing can not be continued.

To solve the above problems, according to a first aspect of the present invention, there is provided a cache memory control circuit that controls a cache memory in the case where a cache miss occurs for a first move-in request that precedes a second move-in request to a cache memory and a move-in buffer is being acquired, comprising: a first determination section that determines whether an index and upper address section of the request address related to the second move-in request and those of the request address that is related to the preceding first move-in request and has been registered in the move-in buffer do not correspond respectively to each other; and a first processing section that continues processing for the second move-in request in the case where an affirmative result has been obtained in the first determination section.

In the cache memory control circuit according to the present invention, the processing for the second move-in request is forced to be in a standby state in the case where a negative result has been obtained in the first determination section.

In the cache memory control circuit according to the present invention, the first processing section includes: a tag search section that performs a tag search related to the second move-in request; and a second determination section that determines whether an index in the request address related to the second move-in request and a way in the hit cache and an index in the address related to the preceding first move-in request and a replace way in the cache that have been registered in the move-in buffer do not correspond respectively to each other in the case where the tag search section has determined a cache hit, in which the processing for the second move-in request is continued in the case where an affirmative result has been obtained in the second determination section.

In the cache memory control circuit according to the present invention, the processing for the second move-in request is forced to be in a standby state in the case where a negative result has been obtained in the second determination section.

According to a second aspect of the present invention, there is provided a cache memory control circuit that controls a cache memory in the case where a cache miss occurs for a first move-in request that precedes a second move-in request to a cache memory and a move-in buffer is being acquired, the move-in buffer including information concerning an upper address section of a replace address corresponding to a move-in request and information indicating whether a replace destination is valid or not, the circuit comprising: a first determination section that determines whether an index and upper address section of the request address related to the second move-in request and those of the request address that is related to the preceding first move-in request and has been registered in the move-in buffer do not correspond respectively to each other; a third determination section that determines whether an index and upper address section in the address related to the second move-in request and those in the replace address that is related to the preceding first move-in request and has been registered in the move-in buffer do not correspond respectively to each other; and a second processing section that continues the processing for the second move-in request in the case where an affirmative result has been obtained both in the first and third determination sections and the replace destination is valid.

According to a third aspect of the present invention, there is provided a cache memory control method that controls a cache memory in the case where a cache miss occurs for a first move-in request that precedes a second move-in request to a cache memory and a move-in buffer is being acquired, comprising: a first determination step of determining whether an index and upper address section of the request address related to the second move-in request and those of the request address that is related to the preceding first move-in request and has been registered in the move-in buffer do not correspond respectively to each other; and a first processing step of continuing processing for the second move-in request in the case where an affirmative result has been obtained in the first determination step.

In the cache memory control method according to the present invention, the processing for the second move-in request is forced to be in a standby state in the case where a negative result has been obtained in the first determination step.

In the cache memory control method according to the present invention, the first processing step includes: a tag search step of performing a tag search related to the second move-in request; and a second determination step of determining whether an index in the request address related to the second move-in request and a way in the hit cache and an index in the address related to the preceding first move-in request and a replace way in the cache that have been registered in the move-in buffer do not correspond respectively to each other in the case where a cache hit has been determined in the tag search step, in which the processing for the second move-in request is continued in the case where an affirmative result has been obtained in the second determination step.

In the cache memory control method according to the present invention, the processing for the second move-in request is forced to be in a standby state in the case where a negative result has been obtained in the second determination step.

According to a fourth aspect of the present invention, there is provided a cache memory control method that controls a cache memory in the case where a cache miss occurs for a first move-in request that precedes a second move-in request to a cache memory and a move-in buffer is being acquired, the move-in buffer including information concerning an upper address section of a replace address corresponding to a move-in request and information indicating whether a replace destination is valid or not, the method comprising: a third determination step of determining whether an index and upper address section of the request address related to the second move-in request and those of the request address that is related to the preceding first move-in request and has been registered in the move-in buffer do not correspond respectively to each other, as well as determining whether an index and upper address section in the address related to the second move-in request and those in the replace address that is related to a preceding first move-in request and has been registered in the move-in buffer do not correspond respectively to each other; and a second processing step of continuing the processing for the second move-in request in the case where an affirmative result has been obtained in the third determination step and the replace destination is valid.

According to the present invention, it is possible to continue the processing for a succeeding move-in request that has obtained a cache hit to a clean block and therefore can actually be processed without increasing any physical quantity, thereby improving efficiency in the processing for a succeeding request, although the processing for a succeeding move-in request is forced to wait until the processing for a preceding move-in request has been completed in the conventional art. Further, it can be determined whether different ways are targeted at an early stage of the move-in request, so that the case where processing cannot be performed can be determined without waiting for confirmation of a cache hit as in the case of the conventional art. As a result, it is possible to minimize useless ensuring of resources or activation of additional processing from the time at which the move-in request has been issued until the time at which the case where the processing cannot be performed has been determined.

DETAILED DESCRIPTION OF THE PREFERRED EMBODIMENTS

Embodiments of the present invention will be described below with reference to the accompanying drawings.

As described above, when the way that is a processing target related to a move-in request (succeeding move-in request) and the way that is a processing target related to a preceding move-in request differ from each other, any problem does not occur even if the processing for the succeeding request is continued, that is, processing can be continued without an error being made. In the conventional art, it has been determined whether processing can be continued or not, by checking the cache state at the time of a cache hit. In the present invention, the determination is made depending not on the cache state but the state of a way related to a preceding request address. This will now be described hereinafter.

Figure 1:
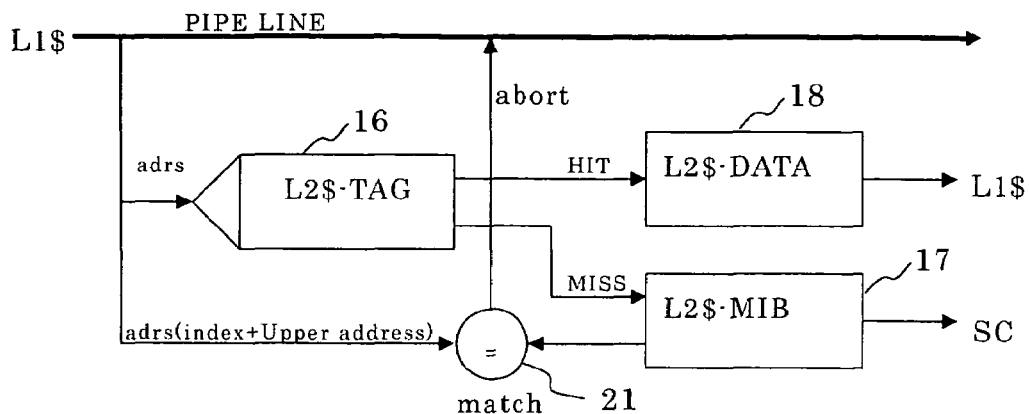
FIG. 1 is a block diagram showing a cache memory control circuit according to an embodiment of the present invention.

FIG. 1 is a block diagram showing a cache memory control circuit according to an embodiment of the present invention. In this circuit, a search result obtained by a tag search section 16 of the L2 cache is sent to the L1 cache through a data section 18 of the L2 cache in the case of a cache hit. On the other hand, in the case of a cache miss, the MIB 17 of the L2 cache is acquired and a move-in request is issued to the SC 3. Here, a match circuit 21 that corresponds to a control circuit of the present invention is provided between the L1 cache and the MIB 17 of the L2 cache. The match circuit 21 compares after-mentioned predetermined pieces of information from the caches and outputs abort to the pipeline in the predetermined matching case. In the case where the abort is not output, processing for a succeeding move-in request is continued.

First Embodiment

Figure 2:
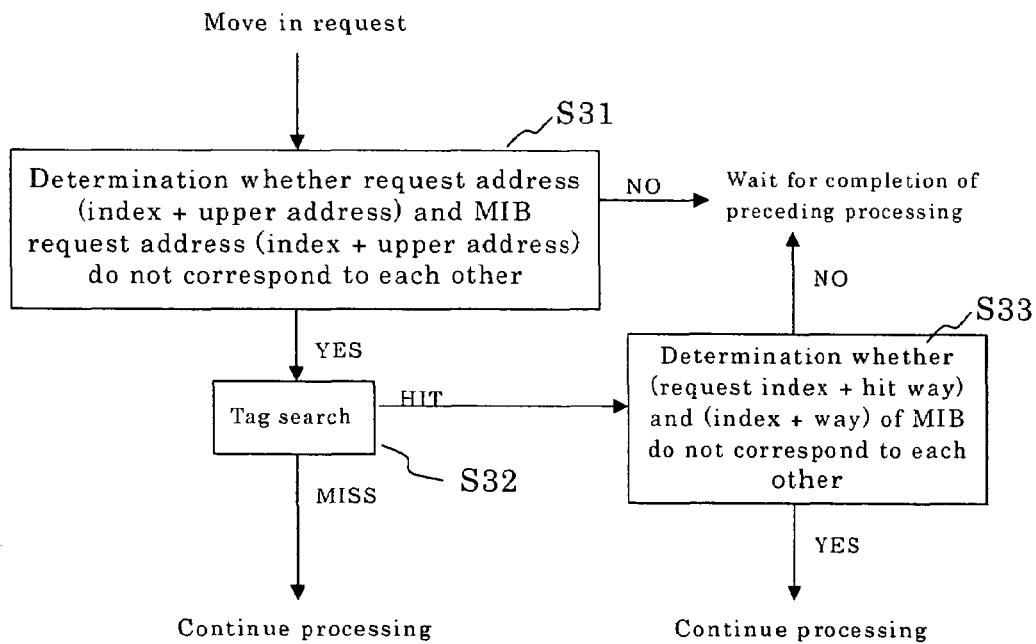
FIG. 2 is a flowchart showing an operation of the first embodiment.
Figure 3:
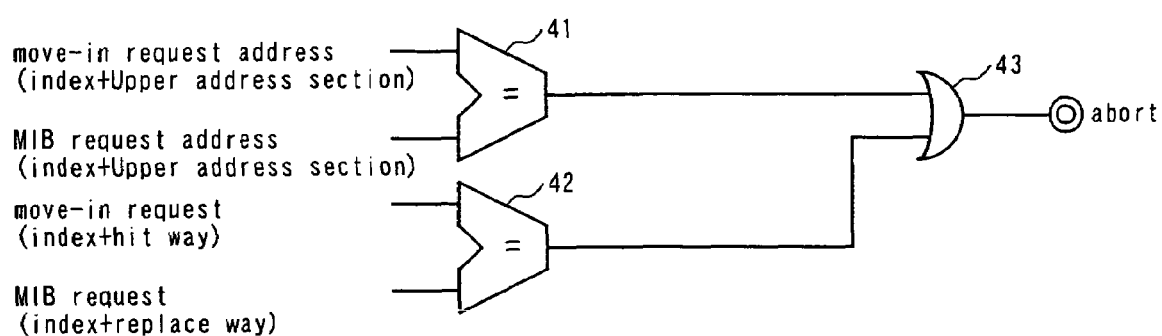
FIG. 3 is a circuit diagram showing a concrete configuration of a match circuit according to the first embodiment.

A first embodiment of the present invention in the above configuration will be described below. FIG. 2 is a flowchart showing an operation of the first embodiment. FIG. 3 shows a concrete configuration thereof.

Firstly, it is determined whether an index and upper address section in the request address related to the move-in request issued from the L1 cache do not correspond respectively to those in the request address that is related to a preceding move-in request and that has been registered in the MIB (step S31). When the determination result is negative (Match: YES in step S31), which means that the ways related to the preceding and succeeding move-in requests correspond to each other, so that abort information that forces the processing for the succeeding move-in request to wait is output. As a result, processing remains in a standby state until the MIB that had been acquired along with the issuance of the preceding move-in request has been released.

When the determination result is affirmative (No Match: Yes in step S31), a tag search is performed in order to continue processing (step S32). When the result of the tag search is a cache miss, a move-in request is issued to the SC.

When the result of the tag search is a cache hit, a hit way corresponding to the request is acquired. Then, an index of the request address related to the move-in request and the hit way are compared respectively with the index that has been registered in the MIB and a move-in way to the cache in the match circuit (step S33: it is determined whether they do not correspond to each other respectively). When the result is negative (Match), processing remains in a standby state until the MIB that had been acquired along with the issuance of the preceding move-in request has been released.

When the result of the above comparison is affirmative (No match), processing is continued and data of the L2 cache is send to the L1 cache.

In the circuit diagram of FIG. 3, a first match circuit 41 receives information concerning the index of the request address related to a move-in request and the upper address section thereof through a first input terminal, and information concerning the index of the request address that is related to a preceding move-in request and has been registered in the MIB and the upper address section thereof through a second input terminal. The first match circuit 41 determines whether an index and upper address section of the request address related to a move-in request do not correspond to those of the request address that is related to a preceding move-in request and that has been registered in the MIB. When the result is negative (Match), the first match circuit 41 outputs "1".

A second match circuit 42 receives information concerning the index of the request address related to a move-in request and the hit way corresponding to the request through a first input terminal, and information concerning the index of the request address that is related to a preceding move-in request and has been registered in the MIB and the replace way corresponding to the request through a second input terminal. The second match circuit 42 determines whether an index of the request address and hit way related to a move-in request do not correspond to an index of the request address and replace address that are related to a preceding move-in request and that have been registered in the MIB. When the result is negative (Match), the second match circuit 42 outputs "1".

An OR circuit 43 outputs abort in either of the above case to force processing to wait.

In the first embodiment, it is possible to continue the processing for all clean blocks that have been forced to wait collectively if the conditions are met. However, in this case, it cannot be seen until the hit way has been acquired whether processing can be continued at the time of a cache hit. During the time in which the determination cannot be made, unprofitable ensuring of resources or activation of additional processing may be performed. To cope with this problem, a second embodiment is configured as follows.

Second Embodiment

Figure 4:
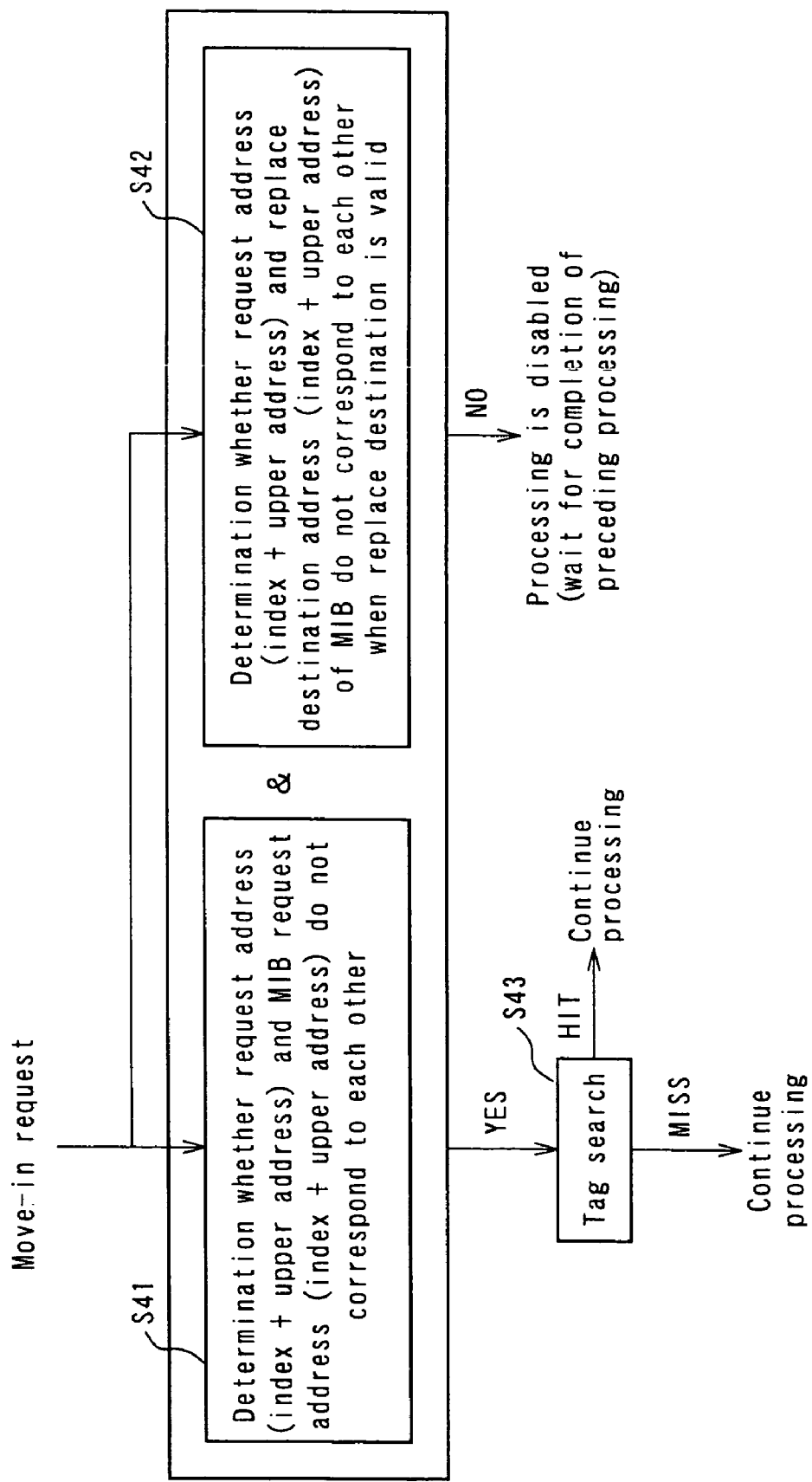
FIG. 4 is a flowchart showing an operation of a second embodiment.
Figure 5:
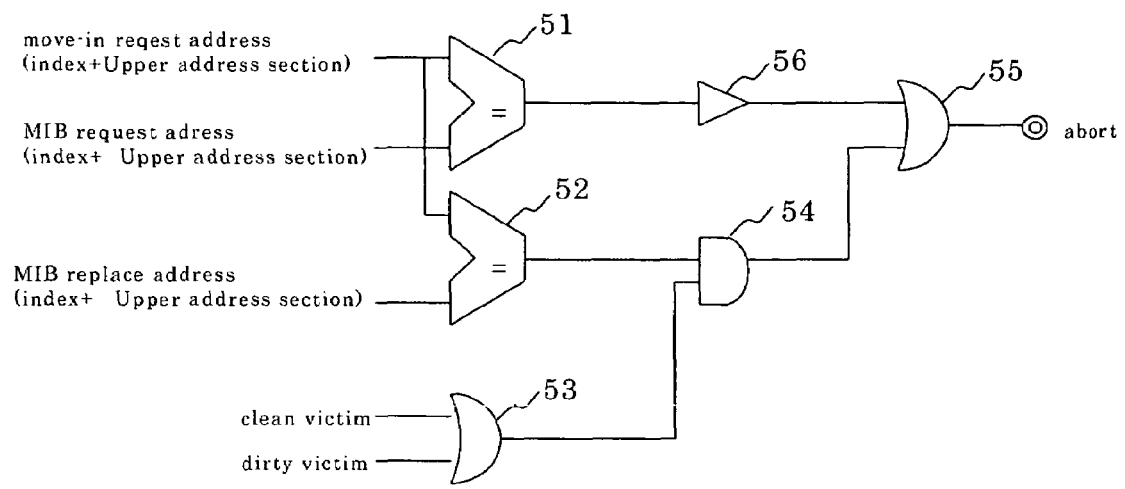
FIG. 5 is a circuit diagram showing a concrete configuration of a match circuit according to the second embodiment.
Figure 6:
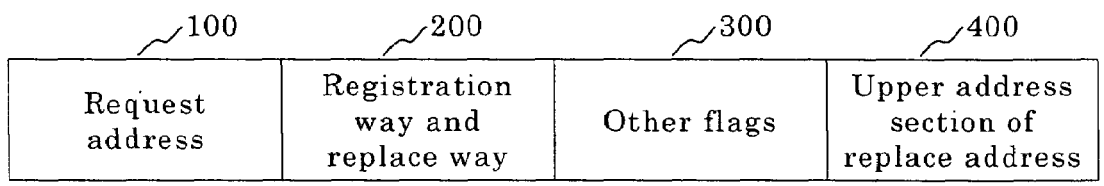
FIG. 6 is a view showing an MIB configuration according to the second embodiment.

FIG. 4 is a flowchart showing an operation of the second embodiment. FIG. 5 shows a match circuit according to the second embodiment. In the second embodiment, the comparison between the addresses of succeeding and preceding requests and the comparison between the address of the succeeding request and the preceding replace address are performed at the same time. In the second embodiment, therefore, the MIB includes an upper address section of replace address 400 in addition to the request address 100, registration way and replace way 200, and other flags 300 as shown in FIG. 6. Further, the MIB is allowed to have a flag (OR of dirty victim and clean victim) indicating whether replace destination is valid or not when the replace address is held.

An operation shown in FIG. 4 will now be described. Firstly, a step of determining whether an index and upper address section of a request address and those of the request address that is related to a preceding move-in request and that has been registered in the MIB do not correspond to each other (step S41) and a step of determining whether an index and upper address section of the replace destination address and those of the replace destination address that is related to a preceding move-in request and that has been registered in the MIB do not correspond to each other are preformed in the case where the replace destination is valid (step S42). When both results are affirmative (No Match in both cases: YES in step S41 and step S42), processing is continued and a tag search is performed (step S43). When correspondence is detected in at least one of the above cases (No in step S41 or step S42), abort is output and processing is forced to wait.

As shown in FIG. 5, information concerning the index and upper address section of the request address related to a move-in request is input to first input terminals of a third match circuit 51 and fourth match circuit 52; information concerning the index and upper address section of MIB request address is input to a second terminal of the third match circuit 51; and information concerning the index and upper address section of the MIB replace address is input to a second terminal of the forth match circuit 52. Further, an OR circuit 53 outputs a flag (OR of dirty victim and clean victim) indicating whether replace destination is valid or not. An AND circuit 54 performs the logical operation on the fourth match circuit 52 and OR circuit 53 to obtain logical multiplication (AND). The AND circuit 54 then performs the logical operation on the output and the third match circuit 51 to obtain logical sum and outputs abort. Note that a buffer 56 is provided in correspondence with the AND circuit 54 to synchronize two-inputs of the OR circuit 55.

Determinations are made on the following point in steps S41 and S42, respectively:

(a) whether correspondence between addresses (64-byte) is obtained; and (b) whether correspondence between replace addresses (64-byte) is obtained and the replace destination is valid.

When at least one of the above cases is met, which means that targets of a succeeding move-in request and preceding move-in request are the same way, abort is issued.

When both conditions of the steps S41 and S42 are not met, targets of a succeeding move-in request and preceding move-in request are different from each other. In this case, succeeding processing can be performed, so that the continuation of processing is permitted. At the same time, it is determined whether cache is hit in a tag search. In the case of a cache hit, processing is continued.

As described above, in the second embodiment, the comparison between the request address and MIB replace address is made at the time point when the comparison between the request address and MIB request address is made. This eliminates the comparison operation between the hit way and MIB replace way after a cache hit.

When the request address corresponds to one of the MIB request address and MIB replace address, ways of preceding and succeeding requests correspond to each other, so that it can be determined at this time that processing can not be performed. When the request address does not correspond to both of the MIB request address and MIB replace address, it becomes clear that ways of preceding and succeeding requests are different from each other. Therefore, it is possible to perform processing promptly after a cache hit is obtained as a result of the tag search.

As a result, more cases can be relieved as compared to the conventional art. Further, whether processing can be continued or not can be determined at an early stage, so that it is possible to minimize useless ensuring of resources or activation of additional processing.

Further, as shown in FIG. 6, the MIB has to include the replace address 400 in addition to the request address 100 in the second embodiment. However, since index sections are common between the replace address 400 and the request address 100, it is actually only necessary for the MIB to have the index section and address designation areas other than index sections of the request address and replace address. Further, some MIBs originally includes the replace address in order to correctly perform snoop processing during replace operation depending on the type of the system in this case, there is much smaller impact on the physical quantity.

Figure 7:
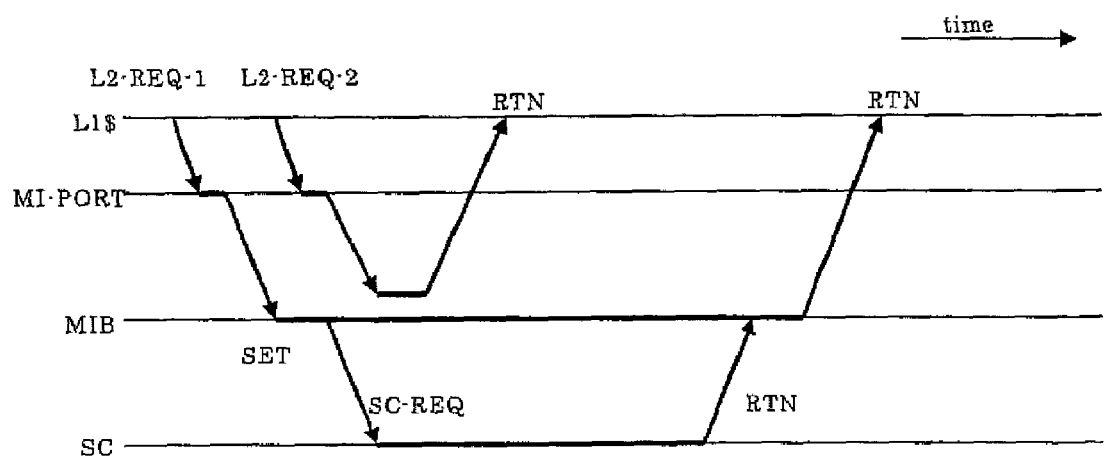
FIG. 7 is a time chart conceptually showing an operation according to the second embodiment.
Figure 8:
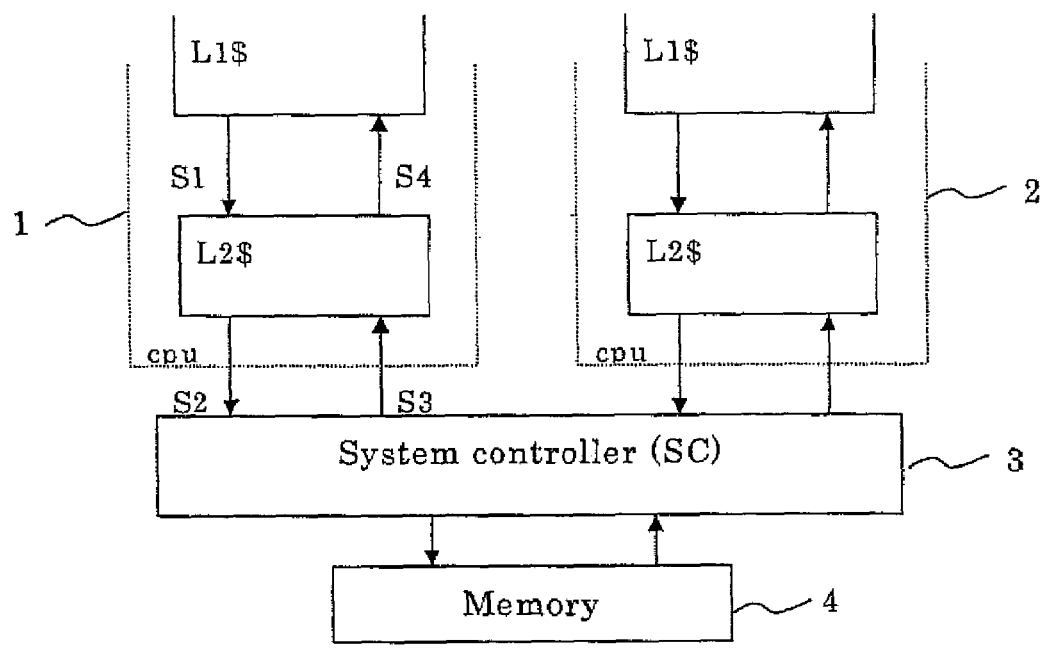
FIG. 8 is a block circuit diagram schematically showing the entire configuration of a CPU.
Figure 9:
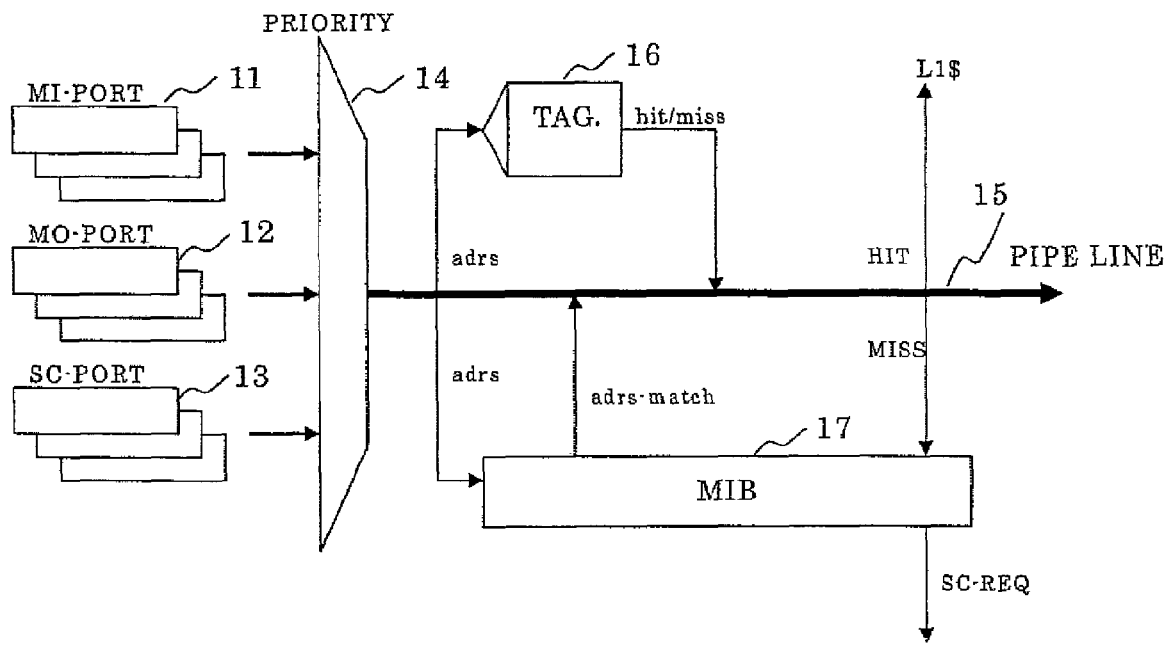
FIG. 9 is a block diagram showing a cache memory controller generally used.
Figure 10:
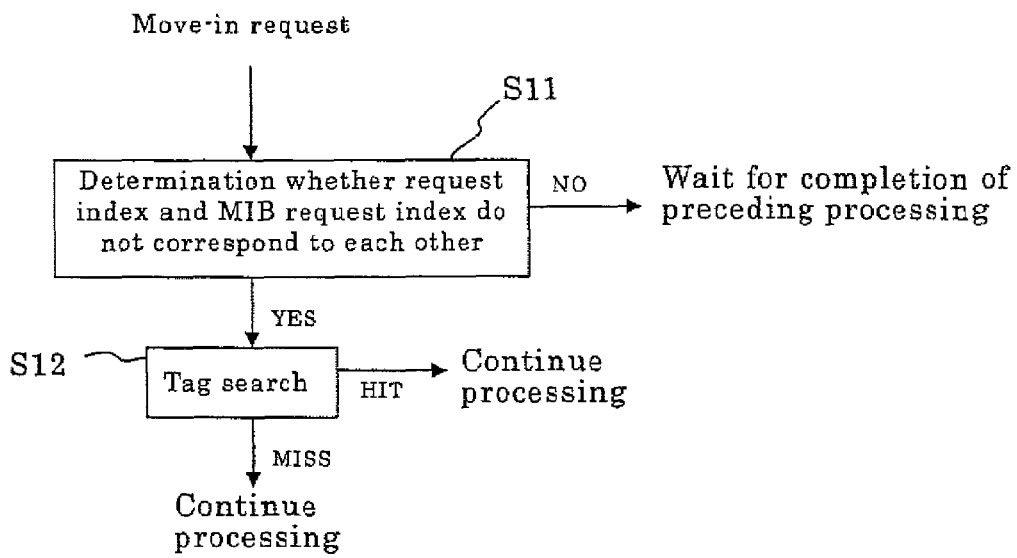
FIG. 10 is a flowchart showing a first conventional cache memory control method.
Figure 11:
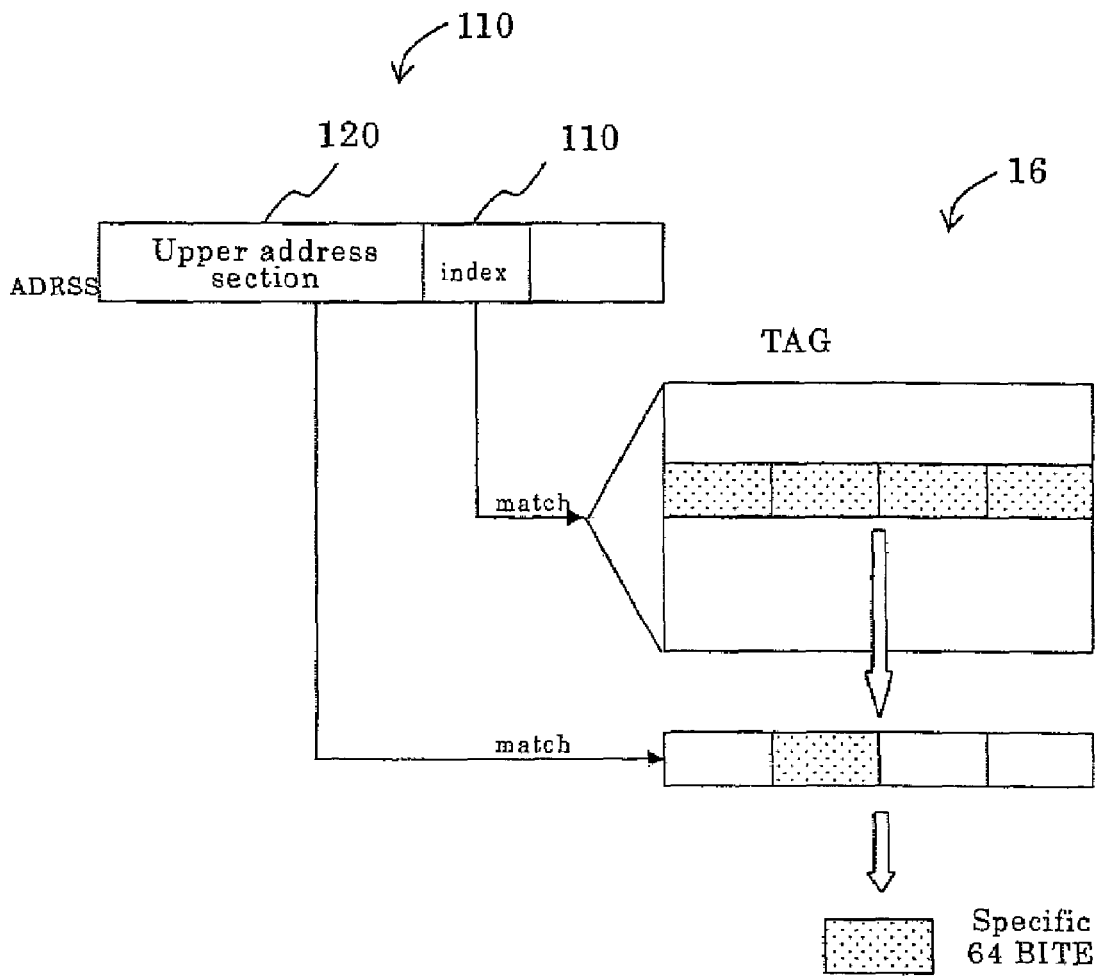
FIG. 11 is a conceptual view showing a conventional tag search method.
Figure 12:
FIG. 12 is a view showing a structure of a conventional MIB.
Figure 13:
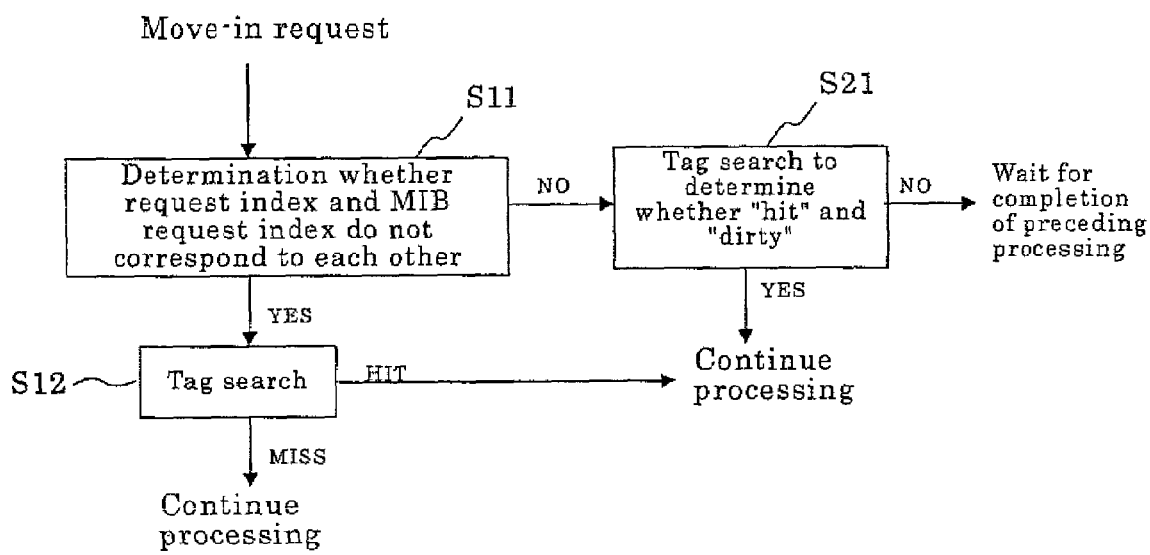
FIG. 13 is a flowchart showing a second conventional cache memory control method.
Figure 14:
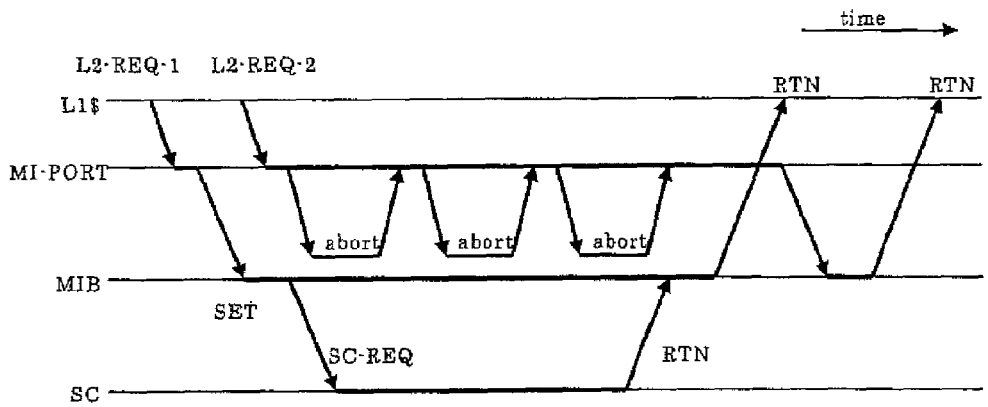
FIG. 14 is a time chart conceptually showing a conventional cache memory control operation.

FIG. 7 is a time chart showing the above operations. As compared with FIG. 14 that shows operations of the conventional art, it is obvious that processing for a succeeding L2 request (REQ-2) is promptly and effectively performed with respect to a preceding L2 request (REQ-1).

What is claimed is:

1. A cache memory control circuit that controls a cache memory when a cache miss occurs for a first move-in request that precedes a second move-in request to the cache memory and a move-in buffer is being acquired, the circuit comprising:

a first determination section that determines, before a tag search, whether a second index and upper address section of a second request address related to the second move-in request do not correspond respectively to a first index and upper address section of a first request address which is related to the preceding first move-in request and which has been registered in the move-in buffer;

a tag search section that performs a tag search related to the second move-in request;

a second determination section that determines whether an index in the second request address related to the second move-in request and a way in a cache hit and an index in the first request address related to the preceding first move-in request and a replace way in a cache that have been registered in the move-in buffer do not correspond respectively to each other in a case where the tag search section has determined a cache hit; and a first replacing section that replaces a replace destination for the second move-in request in a case where the first determination section determines that the second request address does not correspond to the first request address which has been registered in the move-in buffer and the move-in buffer includes information indicating that the replace destination is a clean victim block that need not to be written back and is valid, wherein the replacing for the second move-in request is continued in a case where the second determination section determines that the index in the second request address related to the second move-in request and the way in the cache hit and the index in the first request address related to the preceding first move-in request and the replace way in the cache that have been registered in the move-in buffer do not correspond respectively to each other.

2. The cache memory control circuit according to claim 1, wherein the replacing of the replace destination for the second move-in request is forced to be in a standby state in the case where the first request address has not been registered in the move-in buffer or the first determination section determines that the first request address corresponds to the second request address.

3. The cache memory control circuit according to claim 1, wherein the replacing of the replace destination for the second move-in request is forced to be in a standby state in the case where the second determination section determines that the index in the request address related to the second move-in request and the way in the hit cache and the index in the address related to the preceding first move-in request and the replace way in the cache that have been registered in the move-in buffer correspond respectively to each other.

4. A cache memory control circuit that controls a cache memory in the case where a cache miss occurs for a first move-in request that precedes a second move-in request to the cache memory and a move-in buffer is being acquired, the move-in buffer including information concerning an upper address section of a replace address corresponding to a move-in request and information indicating whether a replace destination is a clean victim block that need not to be written back and is valid, the circuit comprising:

a first determination section that determines, before a tag search, whether a second index and upper address section of a second request address related to the second move-in request do not correspond respectively to a first index and upper address section of a first request address which is related to the preceding first move-in request and which has been registered in the move-in buffer;

a third determination section that determines whether an index and upper address section in the second address related to the second move-in request and those in the replace address that is related to the preceding first move-in request and has been registered in the move-in buffer do not correspond respectively to each other; and a second replacing section that replaces the replace destination for the second move-in request in the case where the first determination section determines that the second request address does not correspond to the first request address that has been registered in the move-in buffer, and where the third determination section determines the index and upper address section in the second address related to the second move-in request and those in the replace address that is related to the preceding first move-in request and has been registered in the move-in buffer do not correspond respectively to each other and the replace destination is the clean victim block.

5. A cache memory control method that controls a cache memory when a cache miss occurs for a first move-in request that precedes a second move-in request to the cache memory and a move-in buffer is being acquired, comprising:

determining, before a tag search, whether a second index and upper address section of a second request address related to the second move-in request do not correspond respectively to a first index and upper address section of a first request address which is related to the preceding first move-in request and which has been registered in the move-in buffer;

performing a tag search related to the second move-in request;

determining whether an index in the second request address related to the second move-in request and a way in the cache hit and an index in the first request address related to the preceding first move-in request and a replace way in the cache that have been registered in the move-in buffer do not correspond respectively to each other in a case where a cache hit has been determined in the tag search;

continuing replacing for the second move-in request when determined that the second request address does not correspond to the first request address which has been registered in the move-in buffer and the move-in buffer includes information indicating that a replace destination is a clean victim block that need not to have written back and is valid, wherein the replacing for the second move-in request is continued when determined as the index in the second request address related to the second move-in request and the way the hit cache and an index in the first request address related to the preceding first move-in request and the replace way in the cache that have been registered in the move-in buffer do not correspond respectively to each other in the determining.

6. The cache memory control method according to claim 5, wherein the replacing the replace destination for the second move-in request is forced to be in a standby state when determined that the first request address has not been registered in the move-in buffer or the first request address corresponds to the second request address in the determining step.

7. The cache memory control method according to claim 5, wherein the replacing of the replace destination for the second move-in request is forced to be in a standby state when determined that the index in the request address related to the second move-in request and the way in the hit cache and an index in the address related to the preceding first move-in request and the replace way in the cache that have been registered in the move-in buffer correspond respectively to each other in the determining step.

8. A cache memory control method that controls a cache memory when a cache miss occurs for a first move-in request that precedes a second move-in request to the cache memory and a move-in buffer is being acquired, and the move-in buffer including information concerning an upper address section of a replace address corresponding to a move-in request and information indicating whether a replace destination is a clean victim block that need not to be written back and is valid, the method comprising:

determining, before a tag search, whether a second index and upper address section of a second request address related to the second move-in request do not correspond respectively to a first index and upper address section of a first request address which is related to the preceding first move-in request and which has been registered in the move-in buffer, as well as determining whether the first index and upper address section in the second address related to the second move-in request and those in the replace address that is related to the preceding first move-in request and has been registered in the move-in buffer do not correspond respectively to each other; and continuing replacing the replacing the replace destination for the second move-in request when determined that the second request address does not correspond to the first request address that has been registered in the move-in buffer and when determined that the index and upper address section in the second address related to the second move-in request and those in the replace address that is related to the preceding first move-in request and has been registered in the move-in buffer do not correspond respectively to each other and the replace destination is the clean victim block.

* * * * *

UNITED STATES PATENT AND TRADEMARK OFFICE
CERTIFICATE OF CORRECTION

| | | |
|---|---|---|
| PATENT NO. | : 7,689,770 B2 | |
| APPLICATION NO. | : 10/986868 | |
| DATED | : March 30, 2010 | |
| INVENTOR(S) | : Koken Shimizuno | |

It is certified that error appears in the above-identified patent and that said Letters Patent is hereby corrected as shown below:

Title Page, Item (57) (Abstract), Line 10, change "other," to --other;--.

Column 12, Line 31, after "replacing the" delete "replacing the". (Second Occurrence)

Signed and Sealed this

Twenty-second Day of June, 2010

David J. Kappos
*Director of the United States Patent and Trademark Office*